United States Patent [19]

Oogita

[11] Patent Number: 4,970,453
[45] Date of Patent: Nov. 13, 1990

[54] SOLAR CHARGING SYSTEM FOR AN IC CARD HAVING VOLTAGE CURRENT REGULATION

[75] Inventor: Yoshinori Oogita, Nara, Japan

[73] Assignee: Sharp Kabushiki Kaisha, Osaka, Japan

[21] Appl. No.: 443,816

[22] Filed: Nov. 29, 1989

[30] Foreign Application Priority Data

Nov. 16, 1987 [JP] Japan ................. 62-288789

[51] Int. Cl.$^5$ .................... H02J 7/04; G06K 19/07
[52] U.S. Cl. ........................ 323/906; 320/2; 320/3; 320/9; 235/380
[58] Field of Search ............ 323/906; 320/1, 2, 3, 320/4, 9, 11, 53, 57, 59; 235/380, 381, 382, 382.5

[56] References Cited

U.S. PATENT DOCUMENTS

| | | | |
|---|---|---|---|
| 4,311,953 | 1/1982 | Fukuda et al. | 320/57 X |
| 4,422,031 | 12/1983 | Vigerstol | 320/59 X |
| 4,449,057 | 5/1984 | Ishiwata | 323/906 X |
| 4,539,516 | 9/1985 | Thompson | 320/53 X |
| 4,571,532 | 2/1986 | Jaster | 323/906 X |
| 4,626,764 | 12/1986 | Weinhardt | 323/906 X |
| 4,634,953 | 1/1987 | Shoji et al. | 320/1 |
| 4,651,080 | 3/1987 | Wallace | 323/906 X |
| 4,661,758 | 4/1987 | Whittaker | 323/906 X |
| 4,701,693 | 10/1987 | Nishimura | 323/906 X |
| 4,746,787 | 5/1988 | Suto et al. | 235/380 X |
| 4,827,111 | 5/1989 | Kondo | 235/380 |

Primary Examiner—Steven L. Stephan
Assistant Examiner—Emanuel Todd Voeltz
Attorney, Agent, or Firm—Flehr, Hohbach, Test, Albritton & Herbert

[57] ABSTRACT

An electronic apparatus such as an IC card is comprised of a power source including a secondary cell and solar cells which are connected in parallel to the secondary cell, an IC and a plurality of terminals inclusive of a power receiving terminal for contacting an external power source, and is characterized as also having voltage regulating diodes connected between the power receiving terminal and the secondary cell for regulating voltage applied to the secondary cell, and a current regulating diode connected between the power receiving terminal and the secondary cell and in parallel to the voltage regulaitng diodes for preventing the secondary cell from becoming directly recharged by an external power source connected to the apparatus through the power receiving terminal.

8 Claims, 2 Drawing Sheets

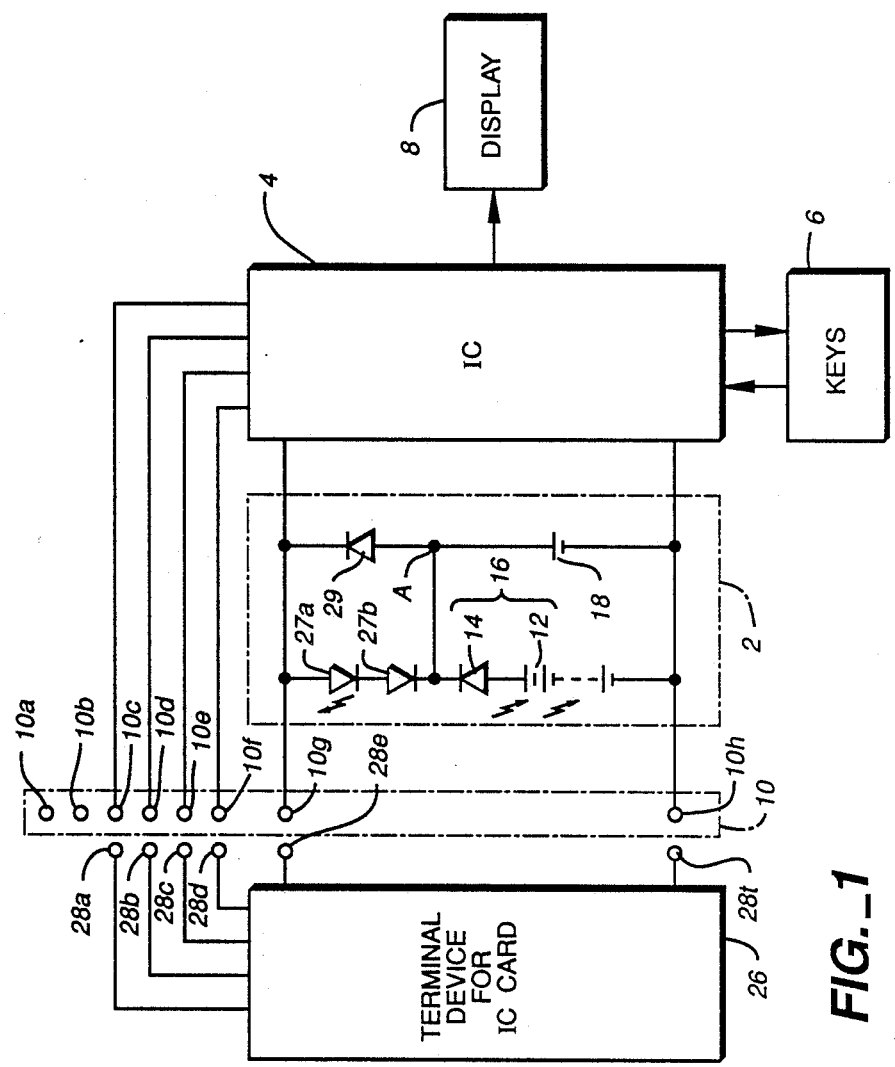
FIG._1

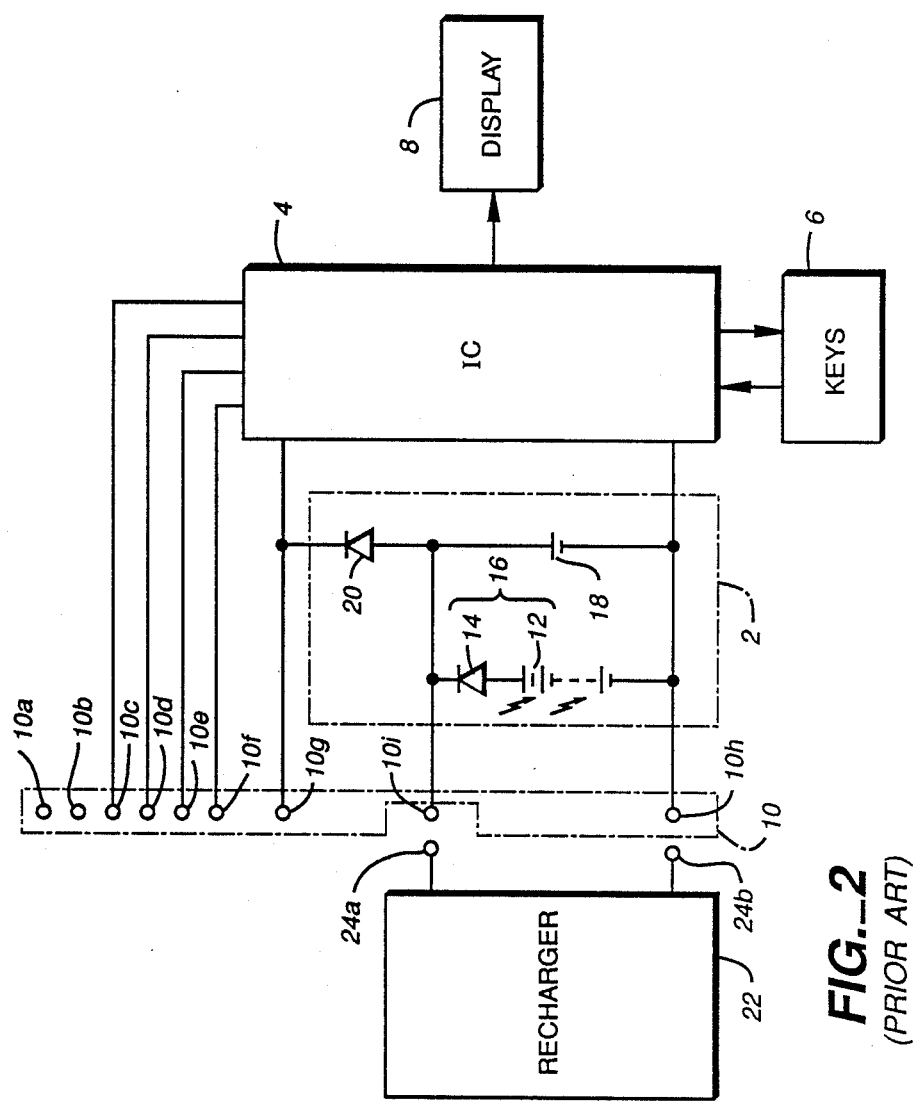
FIG._2
(PRIOR ART)

4,970,453

SOLAR CHARGING SYSTEM FOR AN IC CARD HAVING VOLTAGE CURRENT REGULATION

This is a continuation of application Ser. No. 272,228 filed Nov. 16, 1988 now abandoned.

BACKGROUND OF THE INVENTION

This invention relates to small electronic apparatus containing an integrated circuit (IC) and a secondary cell and more particularly to an IC card with an improved charging system for a secondary cell contained therein.

IC cards with functions both as an embossed card and as a magnetic card are coming to be widely used. Such an IC card generally has on its front surface a magnetic stripe for writing data thereon and reading data therefrom so as to function as a magnetic card, an embossed section where certain data necessary for the card are imprinted, and a plurality of contact means for connection to an external apparatus. Some IC cards are further provided on the back surface with a display device for displaying data, etc., a key input section with a plurality of keys used for controlling the display and a power source such as a cell.

With an IC card thus structured, it is not easy to replace the cell with a new one because the card is of a limited thickness. Use is therefore commonly made of a paper-like 3 V secondary cell of lithium. Since an organic electrolyte is generally used in such a secondary cell, the electrolyte may be decomposed if a voltage greater than 3 V is applied for recharging. If this happens, the cell can no longer serve as a rechargeable cell.

In view of this problem, there have been IC cards with a circuit as shown in FIG. 2 for charging the secondary cell. With reference to FIG. 2, the circuit is comprised of a power source 2, an IC 4 driven by the power from the source 2, a control key section 6, a display device 8 for displaying data, etc. in response to display signals from the IC 4 and a group of eight pin terminals (collectively indicated at 10) for the IC 4. The group of these pin terminals 10 is for connecting the IC card to a terminal device and is comprised of free pin terminals 10a and 10b, an input/output (I/O) pin terminal 10c, a pin terminal 10d for resetting, a pin terminal 10e for a clock signal, a pin terminal 10f for receiving power, for example, from a 21 V first power source ($V_{pp}$), a pin terminal 10g for receiving power, for example, from a 5 V second power source ($V_{cc}$), and a grounding pin terminal 10h. Symbol 10i indicates a terminal for recharging to be described below.

The power source 2 is comprised of solar cells 12, a reverse current preventing diode 14 connected in series with the solar cells 12 with polarity backward with respect to that of the solar cells 12, a secondary cell 18 which is connected in parallel to the series connection 16 of the solar cells 12 and the diode 14, and another reverse current preventing diode 20 serving to prevent the secondary cell 18 from becoming charged directly by a voltage applied to the pin terminal 10g for receiving power. The solar cells 12 and the secondary cell 18 are so connected that their terminals of the same polarity are joined together.

With an IC card thus structured, the power source 2 is usually used as the source of power for the IC 4. The secondary cell 18 inside the power source 2 is charged by the solar cells 12 through the reverse current preventing diode 14. When there is no incident sun light, causing the voltage of the solar cells 12 to drop, and when the secondary cell 18 remains uncharged for a long period of time, the voltage from the secondary cell 18 may drop to such an extent that the IC 4 cannot be properly driven any more. In such a situation, the user may wait until there is sunshine again and the voltage of the solar cells 12 rises. If it is desired to recharge the secondary cell 18 immediately so as to make the IC 4 operable, however, an external recharging device must be used to recharge the secondary cell 18. This is done by connecting corresponding terminals 24a and 24b of a dedicated recharger 22 respectively to the recharging pin terminal 10i and to the grounding pin terminal 10h and by quickly and directly charging the secondary cell 18 by the recharger 22.

In summary, a conventional IC card thus operated must be provided with a recharging terminal 10i in addition to the usual set of eight pin terminals 10a–10h for the regular functions of an IC card. In other words, this extra terminal 10i required for the recharging increases the production cost of the card. Moreover, an extra space must be provided for disposing such an extra terminal and this adds to the design restrictions of the card. A further disadvantage of IC cards of this type is that a dedicated recharger for the IC card must be provided for recharging the secondary cell. This also has the adverse effect of increasing the operating cost of the IC card.

These problems of the conventional technologies arise not only in connection with IC cards but also in connection with all kinds of thin electronic apparatus such as electronic notebooks and electronic desk calculators containing ICs and secondary cells.

SUMMARY OF THE INVENTION

It is therefore an object of the present invention to provide an electronic apparatus such as an IC card with a circuit structure such that no additional terminal for recharging need to be provided. It is another object of the present invention to provide an electronic apparatus such as an IC card of which the production cost can be reduced because there is no need for providing a terminal for recharging.

It is still another object of the present invention to provide an electronic apparatus such as an IC card which imposes less stringent spatial restrictions in its design because there is no need for providing a terminal for recharging.

It is still another object of the present invention to provide an electronic apparatus such as an IC card which does not require a dedicated recharging means and can reduce the operational cost.

An electronic apparatus such as an IC card embodying the present invention with which the above and other objects can be achieved is characterized not only as being comprised of a power source including a secondary cell and solar cells which are connected in parallel to the secondary cell, an IC and a plurality of terminals inclusive of a power receiving terminal for contacting an external power source, but also in that voltage regulating means are connected between the power receiving terminal and the secondary cell for regulating voltage applied to the secondary cell and current regulating means connected between the power receiving terminal and the secondary cell and in parallel to the aforementioned voltage regulating means for preventing the secondary cell from becoming directly recharged by an external power source connected to the apparatus through the power receiving terminal.

According to a preferred embodiment of the present invention, the aforementioned voltage regulating means comprise one or more diodes. According to another preferred embodiment of the present invention, the voltage regulating means comprise two or more diodes connected in series and at least one of these diodes is a light-emitting diode. According to still another embodiment of the present invention, the power source further includes a reverse current preventing diode connected between the secondary cell and the solar cells for preventing a reverse current from flowing therebetween.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a circuit diagram of a relevant part of an IC card embodying the present invention, and FIG. 2 is a circuit diagram of a relevant part of a conventional IC card.

DETAILED DESCRIPTION OF THE INVENTION

FIG. 1 is a circuit diagram of a system in an IC card embodying the present invention for recharging its secondary cell. Components which are substantially identical to those already described in connection with FIG. 2 are indicated by the same numerals such as a power source 2, an IC 4 driven by this power source 2, a control key section 6, a display device 8 for displaying data, etc. in response to a display signal from the IC 4, and a group of pin terminals 10 of the IC 4 inclusive of free pin terminals 10a and 10b, an I/O pin terminal 10c, a resetting pin terminal 10d, a clock pin terminal 10e, a first power receiving pin terminal 10f, for example, for receiving power from a 21 V power source ($V_{pp}$), a second power receiving pin terminal 10g, for example, for receiving power from a 5 V power source ($V_{cc}$) and a grounding pin terminal 10h. The power source 2 is comprised of solar cells 12, a reverse current preventing diode 14 connected in series with the solar cells 12 with polarity backward with respect to that of the solar cells 12, and a secondary cell 18 which is connected in parallel to the series connection 16 of the solar cells 12 and the diode 14. The solar cells 12 and the secondary cell 18 are so connected that their terminals of the same polarity are joined together. Numeral 26 indicates a terminal device for IC cards having six pin terminals 28a-28f.

The IC card shown in FIG. 1 is distinguishable from the conventional card shown in FIG. 2 in that there are provided two recharging voltage regulating diodes 27a and 27b connected in series between terminal A of the secondary cell 18 for applying a recharging voltage and the power receiving pin terminal 10g. These two diodes 27a and 27b serve to regulate the recharging voltage applied from the power receiving pin terminal 10g to the secondary cell 18. Between the terminal A of the secondary cell 18 and the power receiving pin terminal 10g is a direct recharging preventing diode 29 connected in parallel with the recharging voltage regulating diodes 27a and 27b. The direct recharging preventing diode 29 serves to prevent direct recharging of the secondary cell 18 by a voltage supplied from the terminal device 26 through the power receiving pin terminal 10g.

When it is desired to recharge the secondary cell 18 from an external power source, the IC is inserted into a slot (not shown) of the terminal device 26 for this purpose such that the power receiving pin terminal 10g of the IC card comes into contact with a power supplying pin terminal 28e of the terminal device 26. With these pin terminals 10g and 28e contacting each other, the voltage (of source $V_{cc}$) supplied from the terminal device 26 is applied to the secondary cell 18 through the recharging voltage regulating diodes 27a and 27b and the secondary cell 18 is thereby recharged.

If the source $V_{cc}$ supplied from the terminal device 26 is 5 V and the standard recharging voltage of the secondary cell 18 is 3 V, for example, one of the two voltage regulating diodes 27a and 27b may be a light-emitting diode with voltage drop of 1.3 V in the normal direction and the other of these voltage regulating diodes 27a and 27b may be a regular diode with voltage drop of 0.7 V in the normal direction such that a recharging voltage of 3 V is applied to the secondary cell 18. Since the standard recharging voltage of 3 V is applied to the secondary cell 18 in this manner, there is no danger of decomposition of its electrolyte.

The foregoing description of a preferred embodiment of the invention has been presented for purposes of illustration and description. It is not intended to be exhaustive or to limit the invention to the precise form disclosed, and many modifications and variations are possible in light of the above teaching. For example, it goes without saying that the voltage drops of the voltage regulating diodes 27a and 27b in the normal direction, the number of such voltage regulating diodes, etc. need not be as described above but may be appropriately modified, depending upon the voltage supplied from the terminal device 26, the standard recharging voltage of the secondary cell 18, etc. Any such modifications and variations that may be apparent to a person skilled in the art are intended to be included within the scope of this invention.

What is claimed is:

1. In an electronic apparatus comprising a power source, an IC and a plurality of terminals inclusive of a power receiving terminal for contacting an external power source, said power source including a secondary cell and solar cells which are connected in parallel to said secondary cell, said secondary cell having a voltage input terminal, the improvement wherein said apparatus further comprises voltage regulating means connected between said power receiving terminal and said voltage input terminal of said secondary cell for regulating voltage applied to said secondary cell, and current regulating means connected between said power receiving terminal and said voltage input terminal of said secondary cell and in parallel to said voltage regulating means for preventing said secondary cell from becoming directly recharged through said power receiving terminal by an external power source connected to said apparatus through said power receiving terminal.

2. The apparatus of claim 1 wherein said voltage regulating means include one or more diodes.

3. The apparatus of claim wherein said voltage regulating means include two or more diodes which are connected in series and wherein at least one of said diodes is a light-emitting diode.

4. The apparatus of claim 1 further comprising a reverse current preventing diode connected between said secondary cell and said solar cells for preventing a reverse current from flowing therebetween.

5. The apparatus of claim 1 which is an IC card.
6. The apparatus of claim 2 which is an IC card.
7. The apparatus of claim 3 which is an IC card.
8. The apparatus of claim 4 which is an IC card.

* * * * *